United States Patent [19]

Ueda et al.

[11] Patent Number: 5,519,800
[45] Date of Patent: May 21, 1996

[54] OPTICAL CONNECTORS CAPABLE OF CONTACTING ENDFACES OF OPTICAL FIBERS DIRECTLY

[75] Inventors: Tomohiko Ueda; Ichiro Matsuura; Makoto Honjo; Toshiaki Kakii; Toru Yamanishi, all of Kanagawa; Shinji Nagasawa, Ibaraki, all of Japan

[73] Assignees: Sumitomo Electric Industries, Ltd., Osaka; Nippon Telegraph & Telephone Corporation, Tokyo, both of Japan

[21] Appl. No.: 235,853

[22] Filed: Apr. 29, 1994

[30] Foreign Application Priority Data

Apr. 30, 1993 [JP] Japan .................... 5-104483
Apr. 26, 1994 [JP] Japan .................... 6-088640

[51] Int. Cl.⁶ .................................... G02B 6/36
[52] U.S. Cl. .................................... 385/80; 385/85
[58] Field of Search .................... 385/71, 80, 114, 385/85, 54, 89, 115, 120

[56] References Cited

U.S. PATENT DOCUMENTS

| | | | |
|---|---|---|---|
| 3,504,060 | 3/1970 | Gardner | 385/115 |
| 4,292,260 | 9/1981 | Cheung | 264/1.5 |
| 4,699,454 | 10/1987 | Brubaker | 385/89 |
| 4,953,549 | 9/1990 | Mori | 385/901 |
| 5,066,085 | 11/1991 | Gimbutas et al. | 385/901 |
| 5,339,381 | 8/1994 | Ikeda et al. | 385/138 |

FOREIGN PATENT DOCUMENTS

| | | |
|---|---|---|
| 0179399 | 4/1986 | European Pat. Off. . |
| 0514722 | 11/1992 | European Pat. Off. . |
| 59-99408 | 6/1984 | Japan ............ 385/80 |
| 63-75703 | 4/1988 | Japan ............ 385/80 |

OTHER PUBLICATIONS

Schmid; "Fiber–Optic data transmission: a practical, low–cost technology", Electronics, vol. 49, No. 18 ; Sep. 2, 1976; paper 95.

Nagasawa, S. et al., "A High–Performance Single–Mode Multifiber Connector Using Oblique and Direct Endface Contact Between Multiple Fibers Arranged in a Plastic Ferrule", IEEE Photonics Tech. Letters, Oct. 1991, vol. 3, No. 10, pp. 937–939.

Patent Abstracts of Japan (JP62140755) dated Jun. 24, 1987, vol. 11, No. 364 (M–646).

Patent Abstracts of Japan (JP60122905) dated Jul. 1, 1985, vol. 9, No. 281 (P–403).

*Primary Examiner*—John Ngo
*Attorney, Agent, or Firm*—Cushman Darby & Cushman

[57] ABSTRACT

A novel optical connector that includes the following: a optical connector ferrule which is capable of fixing optical fibers; optical fibers fixed onto the optical connector ferrule, such that the end surfaces of the optical fibers project beyond an end surface of the optical connector ferrule; an adhesive for fixing the opticalfibers onto the optical connector ferrule; and a member whose Young's Modulus is less than that of the optical fiber and is provided to an area on the end surface of the optical connector ferrule surronding, at a minimum, the projected portions of the optical fibers. And when the end surface of the optical connector is polished, the ends of the optical fibers are capable of projecting from the end surface of the optical connector ferrule, even if the end surface portion of the optical connector ferrule contains afiller, the hardness of which is less than that oaf the optical fibers.

19 Claims, 4 Drawing Sheets

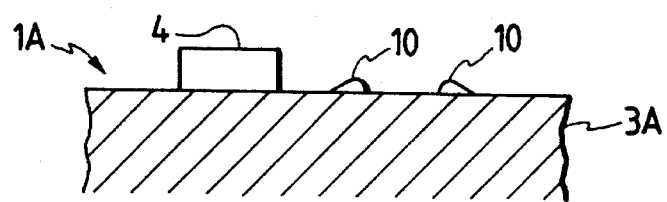
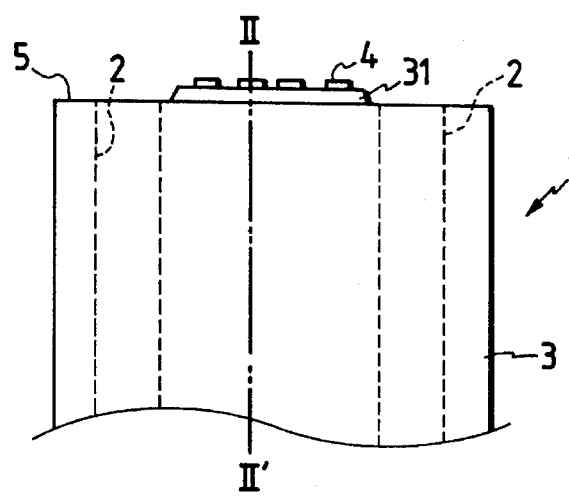
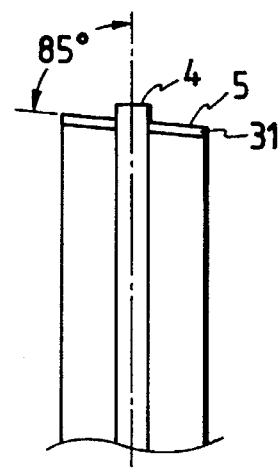
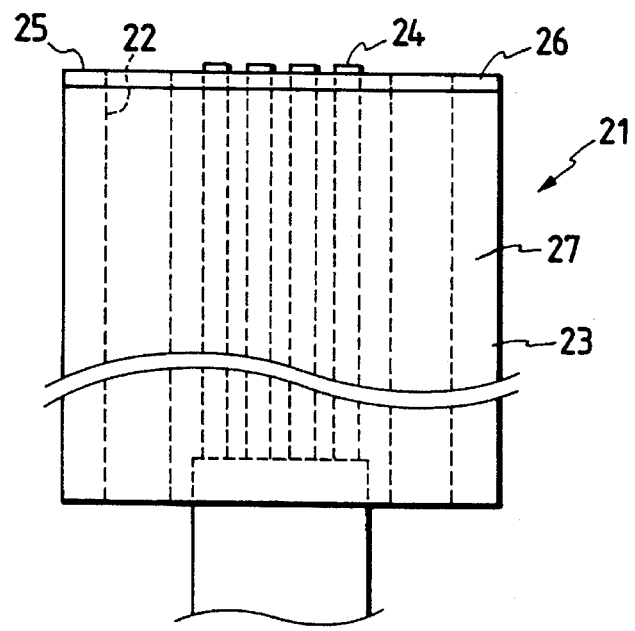

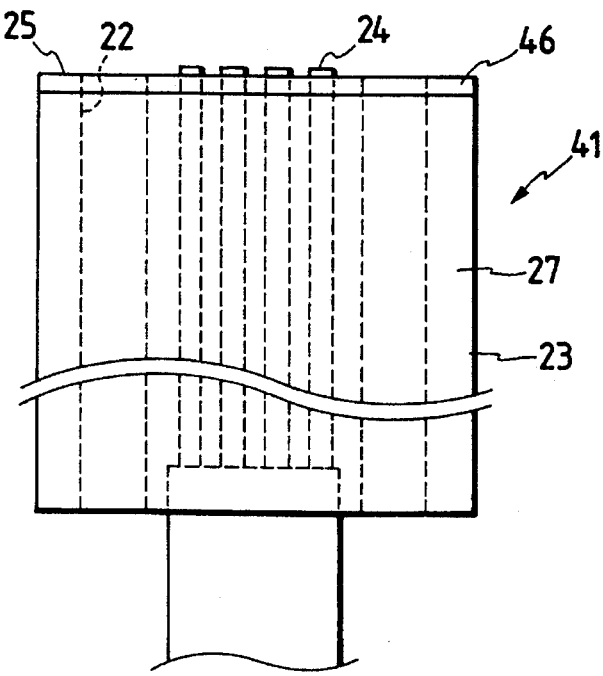
FIG. 6(a)
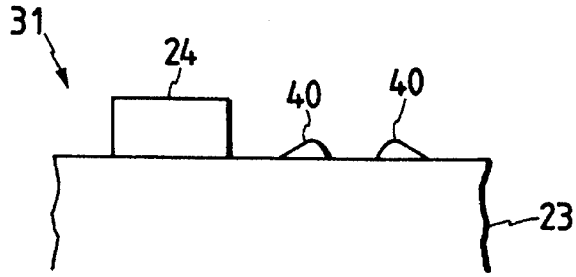
FIG. 6(b)
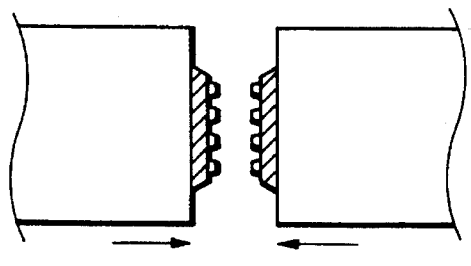
FIG. 7
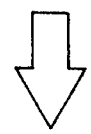
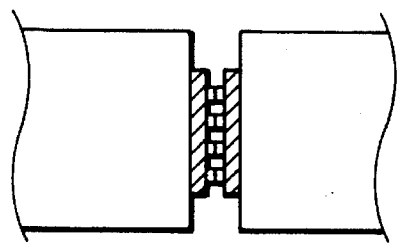

OPTICAL CONNECTORS CAPABLE OF CONTACTING ENDFACES OF OPTICAL FIBERS DIRECTLY

BACKGROUND OF THE INVENTION

1. Field of the Invention

The invention relates to an optical connector for connecting optical fibers.

2. Description of the Related Art

In an optical connector that connects optical fibers, (1) reflected return rays at a connecting node must be reduced (implementation of low reflection); and (2) rays not being propagated to the light-receiving side due to their returning backward or being scattered by reflection at a connecting node must be reduced (reduction in reflection loss).

To meet these requirements, physical contact (PC) coupling (direct contact coupling between optical fibers) is under study for single fiber connectors. For example, a polishing wheel dedicated to optical connectors such as disclosed in Unexamined Japanese Patent Publication No. Sho. 61-137107 has been developed.

On the other hand, for multi-fiber connectors, it is difficult to achieve physical contact coupling for all the fibers. Conventionally, in order to reduce reflection, the end surfaces has been polished obliquely to connect the polished surfaces. However, since this method is not successful to get rid of reflection loss, the optical connectors are coupled by interposing an index matching agent having substantially the same refractive index as that of the optical fiber core between the end surfaces of the optical fibers.

However, the connection made by interposing the index matching agent between the end surfaces of the optical fibers must involve the step of applying the index matching agent. Accordingly, this structure has a disadvantage in terms of operability and handling and, in addition, easily admits contaminations between the end surfaces of the optical fibers, which is a problem.

In view of such circumstances, a coupling method without using the index matching agent has been under study for multi-fiber connectors. Unexamined Japanese Patent Publication No. Hei. 4-34403 discloses a method of connecting optical connectors in which a resin film having a refractive index close to that of the fiber is arranged at an end surface of the optical connector to connect the optical connectors through the resin film.

However, according to the above-mentioned method of providing a resin film having a refractive index close to that of the core on the end surface of the optical connector, a thin resin film is present on the end surface of the optical connector. Accordingly, such an optical fiber not only impairs reliability for the function of coupling the optical connectors over a long period of time, but also leads to a disadvantage in corrosion resistance as well as coupling strength. In addition, if the thickness of the resin film is increased to increase the strength of the resin film, connection loss increases.

A technology for achieving physical contact coupling of all the fibers of multi-fiber connectors in a manner similar to the case of single core connectors has been developed. However, it is difficult to project only the optical fibers stably from the end surface of the optical connector by controlling condition for polishing the entire surface of the ferrule of the multi-fiber connector. Particularly, since a filler, one of materials forming the ferrule, is contained in the ferrule for enhancing the stableness of the size of the ferrule, the filler is easy to project from the polishing surface. Accordingly, it is difficult to project only the optical fiber from the polished end surface of the optical connector. In addition, even if the end surfaces of the optical fibers is projected, the end surfaces of the respective optical fibers are not oriented in the same direction, but in fact, there is a variation of about 0.2° in the inclination of the respective end surfaces. This brings about a problem that coupling between the respective optical fibers becomes unstable.

SUMMARY OF THE INVENTION

It is an object of the present invention is to provide an optical connector capable of achieving stable physical contact coupling even for multi-core connectors with low loss.

To achieve the above object, an optical connector of the present invention includes an optical connector ferrule capable of fixing optical fibers, optical fibers fixed on the optical connector ferrule, the end surface the optical fibers being projected from an end surface of the optical connector ferrule, an adhesive for fixing the optical fibers on the optical connector ferrule, and a member, whose Young's Modulus is less than that of the optical fiber, is provided on the end surface of the optical connector ferrule at least around the projected portions of the optical fibers.

The optical connector of the invention is characterized as slightly projecting the end surfaces of the optical fibers from the end surface of the optical connector ferrule because at the time of polishing the coupling end surface after the optical connector has been fixed, the material having the smaller Young's Modulus value can be is polished more easily. Such slight projection of the end surfaces of the optical fibers allows the optical fibers to be coupled reliably.

BRIEF DESCRIPTION OF THE DRAWINGS

FIG. 3 is a sectional view showing a main portion of an optical connector in a second embodiment of the present invention;

FIG. 4(a) is a schematic diagram showing an optical connector in a third embodiment of the present invention;

FIG. 4(b) is a sectional view on II–II' line of FIG. 4(a);

FIG. 5 is a schematic diagram showing an optical connector in a fourth embodiment of the present invention;

FIG. 6(a) is a schematic diagram showing an optical connector in a fifth embodiment of the present invention;

FIG. 6(b) is sectional view showing a maim portion of an optical connector in a fifth embodiment of the present invention; and FIG. 7 is a explanation view showing a connection of optical fibers of the present invention.

PREFERRED EMBODIMENT OF THE INVENTION

Figure 1A:
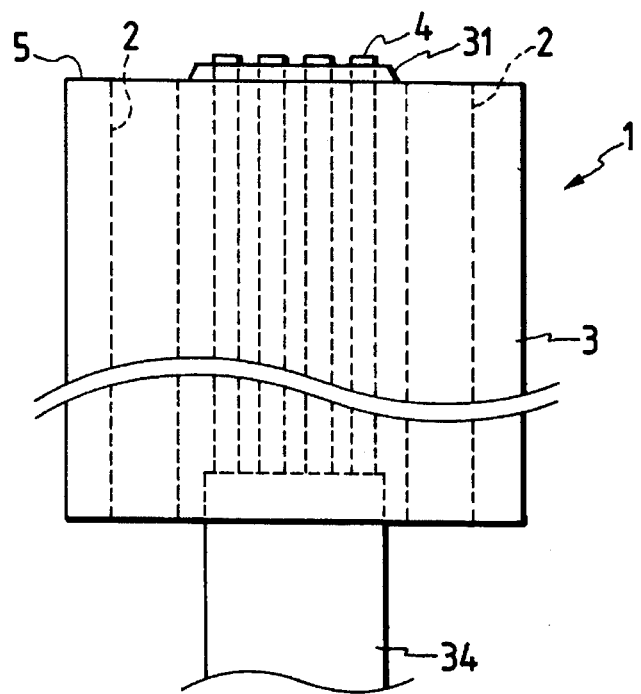
FIG. 1(a) is a schematic diagram showing an optical connector of the present invention.

The preferred embodiments of the present invention will be described referring with the accompany drawings.

FIG. 1 shows an optical connector of a first embodiment of the invention. As shown in the drawing, a multi-fiber optical connector 1 includes: two guide pin holes 2 that pass through in the axial direction of an optical fiber; an optical connector ferrule 3; and optical fibers 4 fixed on the optical connector ferrule 3 by an adhesive 31.

Figure 1B:
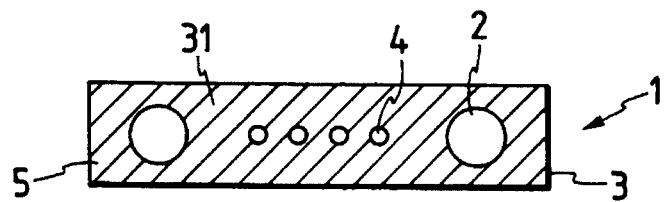
FIGS. 1(b) and (c) are schematic diagrams showing examples of the end surface of the optical connector in a first embodiment of the present invention.
Figure 1C:
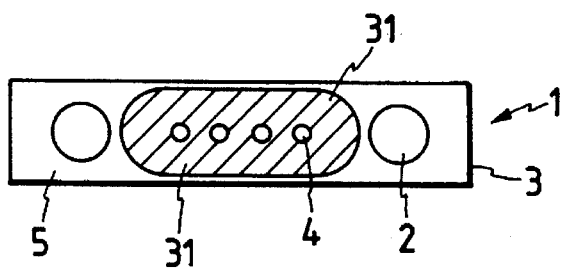

The optical connector ferrule 3 was prepared by transfer molding using an epoxy resin containing no filler, and was low in hardness than the optical fiber 4. Further, the optical fibers 4 of a four-fiber ribbon 34 was used; and an epoxy type adhesive 31 containing no filler was used as the adhesive for fixing the optical fibers 4. The Young's Modulus of the optical fibers 4 was 7400 kgf/mm$^2$, that of the connector ferrule 3 was 2000 kgf/mm$^2$, and that of the adhesive 31 was 600 kgf/mm$^2$. In this case, the Young's Modulus of the adhesive 31 is preferably in the range of 100 to 1000 kgf/mm$^2$, more preferably in the range of 400 to 800 kgf/mm$^2$. In addition, the adhesive 31 can be applied to whole of the end surface 5 of the optical connector ferrule 4 as shown in FIG. 1(b) or only around the optical fibers 4 projected from the end surface 5 as shown in FIG. 1(c).

Such optical connector 1 was formed by fixing end portions of the optical fibers 4 so that the optical fibers 4 could be projected from the end surface 5 of the optical connector ferrule 3 and then polishing both the end surfaces of the optical fibers 4 and that of the optical connector ferrule 3. The top end portions of the optical fibers 4 and the end surface 5 of the optical connector ferrule 3 were subjected to three polishing steps, rough polishing (with a diamond #2000), intermediate polishing (with a diamond lapping film #5000), and finish polishing (with cerium oxide), so that the end surfaces of the optical fibers 4 were projected from the end surface 5 of the optical connector ferrule 3 by about 1 μm as shown in FIG. 1(a). In this case, the projection of the optical fiber 4 is preferably in the range of 1 to 3 μm, however more than 3 μm is allowable.

Figure 2A:
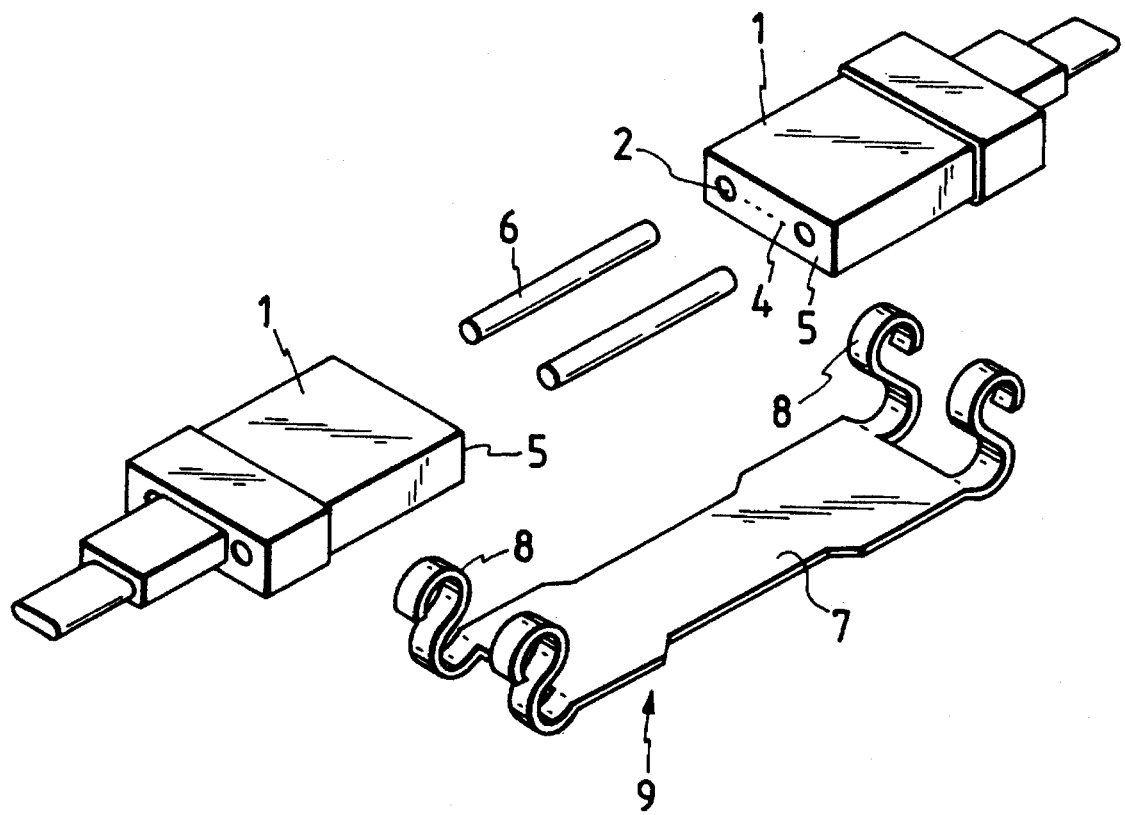
FIGS. 2(a) and (b) are schematic diagrams showing a coupling state of the optical connector of the present invention.
Figure 2B:
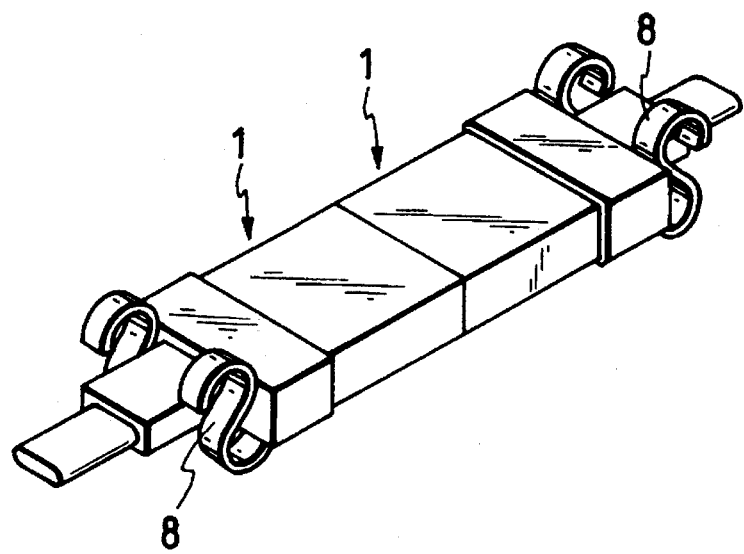

As shown in FIGS. 2(a) and (b), in such multi-fiber optical connector 1, the end surfaces 5 of optical connectors 1 are abutted by inserting guide pins 6 into the guide pin holes 2, and the pair of multi-fiber optical connectors 1 are optically coupled while firmly held by a grip 9 formed by arranging flat springs 8 on both ends of a platelike member 7. That is, since the end surfaces 5 are compressed each other, the end surfaces 5 of the optical fibers 4 which are projected slightly from the end surfaces of the optical connector ferrules 3 can be optically coupled reliably.

Ten pieces of the thus prepared optical connectors 1 were evaluated. As a result of the evaluation, an average connection loss and a reflection at the connection node were 0.3 dB and 40 dB, respectively.

Further, in general, in order to couple optical connectors to each other, the coupling end faces undergo slight deformation by their being biased onto each other in intimate contact, and such deformation absorbs polishing errors and the like. However, in the above-mentioned optical connector 1, the optical connector ferrule 3 is made of a material having a hardness that is smaller than that of the optical fiber 4 and having a high resiliency. Therefore, the deformation of the optical connector ferrule 3 allows polishing errors and the like to be absorbed easily, thus ensuring satisfactory coupling of the optical fibers 4.

Still further, what is required for the optical connector of the invention is only that the optical fibers are projected by polishing the connecting end face in such a manner as described above. Since such polishing can ensure satisfactory projection of the end faces of the optical fibers 4, it can be said that stable optical coupling is achieved in this sense as well.

FIG. 3 is a sectional view showing a main portion of an optical connector in a second embodiment of the present invention. In this embodiment, an optical connector 1A was the same as the first embodiment except that an optical connector ferrule 3A was made of an epoxy resin (Young's Modulus: 490 kgf/mm$^2$) containing calcium carbonate (hardness: 4 in Mohs' scale) as a filler for improving dimensional accuracy. Therefore, parts and components performing the same functions are designated by the same reference numerals, and the descriptions thereof will be omitted to avoid duplication. In this case, the preferable range of the hardness of the filler is in the range of 3 to 6.5 in Mohs' scale, more preferably 4 to 5, because the hardness of the optical fiber 4 made of quartz is about 6.5 in Mohs' scale. Accordingly, a filler made of magnesium carbonate, plastic or the like is preferable. The Young's Modulus including such a filler is preferably in the range of 100 to 1000 kgf/mm$^2$, more preferably in the range of 400 to 800 kgf/mm$^2$. Further, the optical connector 1A was similarly formed by fixing the optical fibers 4 on the optical connector ferrule 3A and thereafter polishing the end faces of the optical fibers 4 and the end face of the optical connector ferrule 3A as described above. In this embodiment, the filler 10 made of calcium carbonate was projected from the end face of the optical connector ferrule 3A slightly (by about 0.2 μm) at the time of polishing, and the end surfaces of the optical fibers 4 were projected from the filler 10 further 0.5 μm than the projection of the filler.

Ten pieces of the thus prepared optical connectors 1A were evaluated. An average connection loss of 0.3 dB and a reflection at the connection node of 40 dB were reported.

In addition, even if a epoxy type adhesive (Young's Modulus: 490 kgf/mm$^2$) containing a-calcium carbonate (hardness: 4 in Mohs' scale) as a low hardness filler was used instead of the adhesive containing no filler in the first and second embodiments, such an adhesive did not affect the results and effects of the embodiments.

To prevent reflection at optical fiber connecting nodes at the time of coupling the optical connectors, it is desirable that the surface of the projected portion including the end surface of the optical fiber is inclined by 5° or more, e.g., 8° with respect to a plane orthogonal to the optical axis of each optical fiber.

FIGS. 4(a) and (b) show an exemplary optical connector having a inclined surface. An optical connector 1B was the same as the first embodiment except that the end surface 5 was polished so that the end surface 5 including also the end surfaces of the optical fibers 4 was inclined by 5° (the angle formed between the coupling end surface 5 and the optical axis is 85°) with respect to a plane orthogonal to the optical axis. When ten pieces of these optical connectors 1B were evaluated, an average connection loss of 0.3 dB and a reflection at the connecting node of 50 dB were reported, which is extremely satisfactory.

FIG. 5 is a schematic diagram showing an optical connector in a fourth embodiment of the present invention. As shown in the drawing, a multi-fiber optical connector 21 includes: two guide pin holes 22 that pass through in the axial direction of an optical fiber; an optical connector ferrule 23; and optical fibers 24 fixed on the optical connector ferrule 23. The optical connector ferrule 23 includes a rear ferrule portion 27 containing quartz as a filler and a top ferrule portion containing no filler. In this embodiment, the Young's Modulus of the rear ferrule portion 27 was 2000 kgf/mm² as a conventional ferrule, the hardness of the filler contained in the rear ferrule portion was 6.5 in Mohs' scale, and the Young's Modulus of the top ferrule portion 26 was 490 kgf/mm². The thickness of the top ferrule portion 26 is generally needed about 1 to 100 μm, and a preferable thickness is 20 to 30 μm. Such an optical fiber is prepared and the end surface of the optical connector 21 was polished as same as the first embodiment. The optical fibers 24 were projected from the end surface 25 by about 1 μm.

FIG. 6(a) is a schematic diagram showing an optical connector in a fifth embodiment of the present invention. In the drawing, an optical connector 41 was the same as the fourth embodiment except that an optical connector ferrule 27 had a top ferrule portion 46 (Young's Modulus: 490 kgf/mm²) made of epoxy resin containing a calcium carbonate (hardness: 4 in Mohs' scale) as a low hardness filler. Therefore, parts and components performing the same functions are designated by the same reference numerals, and the descriptions thereof will be omitted to avoid duplication. The thickness of the top ferrule portion 46 is generally needed about 1 to 100 μm, and a preferable thickness is 20 to 30 μm. The end surface of the optical connector 41 was polished as same as the first embodiment. In this embodiment, as shown in FIG. 6(b) the filler 40 made of calcium carbonate was projected from the end face of the optical connector ferrule 23 slightly (by about 0.2 μm) at the time of polishing, and the end surfaces of the optical fibers 4 were projected from the filler 10 further 0.5 μm than the projection of the filler.

As described above, since the optical connector having a relatively soft member on its coupling end portion, even if respective optical connectors have different inclination on the end portion, the optical connectors are capable of coupling each other without crack as shown in FIG. 7.

While the optical connector having two guide pin holes have been described in the above embodiments, the invention is not, of course, limited thereto. Further, while the example in which the optical fibers are aligned along a line connecting the guide pin holes has been described, it goes without saying that the optical fibers may also be aligned in a direction orthogonal thereto. Furthermore, even if the end surface of the optical connector of the second, fourth and fifth embodiments was formed as same as that of the third embodiment, such structure did not affect the results and effects of the embodiments.

As described in the foregoing, the optical connector of the invention is characterized that projected portions are provided on the coupling end surface and that the low hardness member around the optical fibers is easily deformable at the time the coupling end surfaces of optical connectors are coupled in contact with each other. Therefore, the optical fibers can be optically coupled to each other reliably.

What is claimed is:

1. An optical connector comprising:
   an optical connector ferrule capable of fixing optical fibers;
   optical fibers fixed onto said optical connector ferrule, so that the end surfaces of said optical fibers project from an end surface of said optical connector ferrule a distance of about 1 μm to about 3 μm;
   an adhesive for fixing said optical fibers onto said optical connector ferrule; and
   a member whose Young's Modulus is less than that of said optical fibers, said member being provided to an area on said end surface of said optical connector ferrule surrounding the projected portions of said optical fibers, such that the end surfaces of said optical fibers project beyond said member.

2. The optical connector according to claim 1, wherein the Young's Modulus of the member is from 100 to 1000 kgf/mm².

3. The optical connector according to claim 2, wherein the member includes a filler, and further wherein the hardness of said filler is less than that of the optical fibers.

4. The optical connector according to claim 3, wherein the hardness of the filler is from 3 to 6.5 in Mohs' scale.

5. The optical connector according to claim 2, wherein the end surface of the optical connector ferrule and the end surfaces of the optical fibers are inclined by 5° or more with respect to a plane orthogonal to an optical axis of said optical fibers.

6. The optical connector according to claim 1, wherein the optical connector ferrule includes a filler, and further wherein the hardness of said filler is less than that of the optical fibers.

7. The optical connector according to claim 6, wherein the hardness of the filler is from 3 to 6.5 in Mohs' scale.

8. The optical connector according to claim 6, wherein the end surface of the optical connector ferrule and the end surfaces of the optical fibers are inclined by 5° or more with respect to a plane orthogonal to an optical axis of said optical fibers.

9. The optical connector according to claim 1, wherein the adhesive includes a filler, and further wherein the hardness of said filler is less than that of the optical fibers.

10. The optical connector according to claim 9, wherein the hardness of the filler is from 3 to 6.5 in Moh's scale.

11. The optical connector according to claim 9, wherein the end surface of the optical connector ferrule and the end surfaces of the optical fibers are inclined by 5° or more with respect to a plane orthogonal to an optical axis of said optical fibers.

12. The optical connector according to claim 1, wherein the member is of the same material as the adhesive.

13. The optical connector according to claim 12, wherein the end surface of the optical connector ferrule and the end surfaces of the optical fibers are inclined by 5° or more with respect to a plane orthogonal to an optical axis of said optical fibers.

14. An optical connector according to claim 1, wherein the end surfaces of said optical fibers and said optical connector ferrule are polished.

15. An optical connector comprising:
   an optical connector ferrule capable of fixing optical fibers;
   optical fibers fixed onto said optical connector ferrule, so that the end surfaces of said optical fibers project from an end surface of said optical connector ferrule, such that said end surfaces of said optical fibers and said end surface of said optical connector ferrule are inclined by 5° or more with respect to a plane orthogonal to an optical axis of said optical fibers;
   an adhesive for fixing said optical fibers onto said optical connector ferrule; and a member whose Young's Modulus is less than that of said optical fibers, said member being provided to an area on said end surface of said optical connector ferrule surrounding the projected portions of said optical fibers.

16. The optical connector according to claim 15, wherein the optical connector ferrule includes a filler having a hardness that is less than that of the optical fibers.

17. The optical connector according to claim 15, wherein the adhesive includes a filler having a hardness that is less than that of the optical fibers.

18. The optical connector according to claim 15, wherein the member is of the same material as the adhesive.

19. The optical connector according to claim 15, wherein the end surfaces of the optical fibers project from an end surface of the optical connector ferrule a distance of about 1 µm to about 3 µm.

* * * * *